I. Estell,
Saw-Set,
N° 79,964. Patented July 14, 1868.

WITNESSES:       INVENTOR:
                 Isaac Estell
                 per
                 Alexander Mason
                 Atty

United States Patent Office.

ISAAC ESTELL, OF ST. LOUIS, MICHIGAN.

Letters Patent No. 79,964, dated July 14, 1868.

IMPROVEMENT IN SAW-SETS.

The Schedule referred to in these Letters Patent and making part of the same.

TO ALL WHOM IT MAY CONCERN:

Be it known that I, ISAAC ESTELL, of St. Louis, in the county of Gratiot, and in the State of Michigan, have invented certain new and useful Improvements in Saw-Sets; and do hereby declare that the following is a full, clear, and exact description thereof, reference being had to the accompanying drawings, and to the letters of reference marked thereon.

In the annexed drawings, forming part of this specification—

Figure 1:
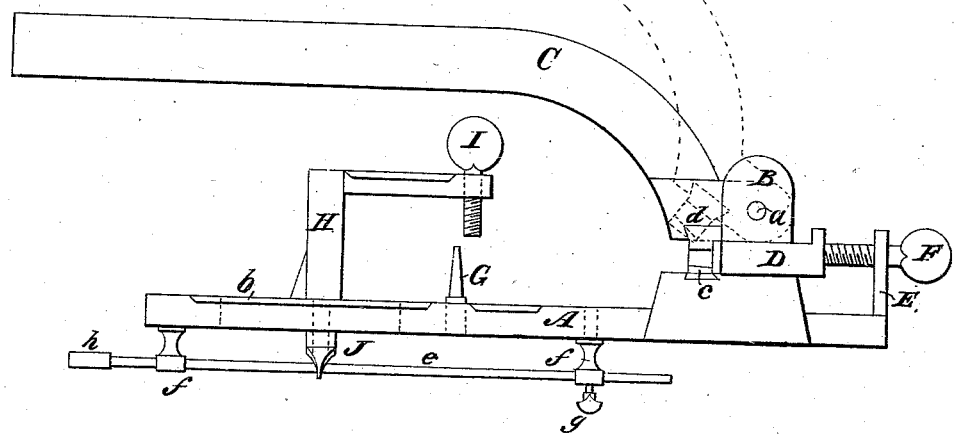

Figure 1 is a side view, and

Figure 2:
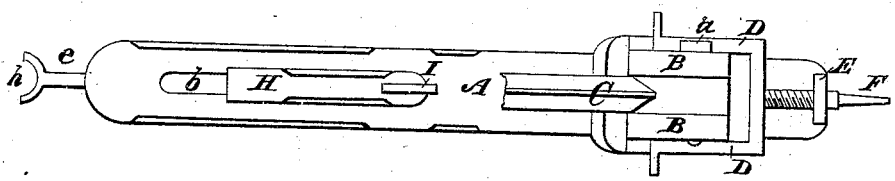

Figure 2 a plan view.

The nature of my invention consists in a device for setting saws, by which any kind of saws, whether straight or circular, may be set, and any width may be obtained.

To enable others skilled in the art to make and use my invention, I will proceed to describe its construction and operation.

A represents a bottom plate, of cast iron or other suitable material, with two standards, B B, between which the lever C is fastened or pivoted by a wrought-iron bolt, a. The lever C, which is also made of cast iron, crooks upwards, then runs forward lengthways along the machine. The guide D, which straddles the standards B B, is worked by a thumb-screw, F, in another standard, E, on the bottom plate, and in rear of the standards B. This guide D serves as a gauge for the teeth of the saw to come against while setting them.

The teeth of the saw rest on a die, c, of cast steel, slightly bevelled, and fastened to the bottom plate, and are then let down by the lever C, which has a cast-steel diamond-shaped die, d, set into it with a dove-tail, and made to reverse, either end forward, and made of different sizes for different-sized saws.

The back of the saw rests on the gauge-screw G, and can be raised or lowered so as to give it any width of set. The saw is held on the gauge-screw G by a thumb-screw, I, in the L-shaped arm H, which can be moved backwards and forwards in the slot b, in the bottom plate A, and can be fastened at any point desired by a nut, J.

By this arrangement any kind and size of saws may be set, except circular saws. For circular saws there is an iron rod, e, running through two holders, f f, and held in any position desired by a thumb-screw, g, in one of them. The holders f f are fastened on the under side of the bottom plate A, and can be taken out and put in at pleasure.

The end of the rod e is provided with a half circle, h, which rests on the shaft of the circular saw when the same is to be set.

The arm H is taken out and the machine raised or lowered, to bring the teeth at any distance required. The machine will then be worked round the saw.

Having thus fully described my invention, what I claim as new, and desire to secure by Letters Patent, is—

The arrangement of the slotted bottom plate A, arm H, screws I and G, gauge D, and rod e, constructed as described, and operating substantially as and for the purposes herein set forth.

In testimony that I claim the foregoing, I have hereunto set my hand and seal, this 7th day of April, 1868.

ISAAC ESTELL. [L. S.]

Witnesses:
L. EVERT,
MARY E. GIDDINGS.